(12) United States Patent
Kimoto

(10) Patent No.: US 8,195,042 B2
(45) Date of Patent: Jun. 5, 2012

(54) IMAGING APPARATUS AND CONTROL METHOD

(75) Inventor: Satoshi Kimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 12/560,552

(22) Filed: Sep. 16, 2009

(65) Prior Publication Data

US 2010/0067892 A1 Mar. 18, 2010

(30) Foreign Application Priority Data

Sep. 16, 2008 (JP) ................................. 2008-236309

(51) Int. Cl.
G03B 13/00 (2006.01)

(52) U.S. Cl. ........................................ 396/124; 348/349

(58) Field of Classification Search .................. 396/124; 348/349

See application file for complete search history.

(56) References Cited

U.S. PATENT DOCUMENTS

| | | | | |
|---|---|---|---|---|
| 2003/0071908 A1* | 4/2003 | Sannoh et al. | ................. | 348/345 |
| 2004/0207743 A1* | 10/2004 | Nozaki et al. | ............ | 348/333.12 |
| 2006/0198624 A1* | 9/2006 | Ono et al. | ...................... | 396/133 |
| 2007/0242942 A1* | 10/2007 | Nozaki et al. | ................. | 396/123 |
| 2008/0074529 A1* | 3/2008 | Terashima | ..................... | 348/345 |
| 2008/0136958 A1* | 6/2008 | Nakahara | ....................... | 348/345 |
| 2008/0284901 A1* | 11/2008 | Misawa | ......................... | 348/349 |
| 2010/0013981 A1* | 1/2010 | Yasuda | .......................... | 348/345 |

FOREIGN PATENT DOCUMENTS

| | | |
|---|---|---|
| JP | 2004-317699 A | 11/2004 |
| JP | 2007-010908 A | 1/2007 |
| JP | 2007-267278 | 10/2007 |

\* cited by examiner

*Primary Examiner* — Rodney Fuller
*Assistant Examiner* — Fang-Chi Chang
(74) *Attorney, Agent, or Firm* — Canon USA Inc. IP Division

(57) ABSTRACT

In an imaging apparatus, wherein when performing auto focus control while continuously moving a focusing lens by using an image sensor that has a lag in timing of electric charge accumulation, a focusing accuracy can be improved. To this end, the imaging apparatus includes the rolling shutter function, an imaging unit configured to convert an object image into an image signal, and a setting unit. When a difference exceeds a predetermined amount in the barycentric position of the optical system between an upper line and an a lower line of the AF area due to the rolling shutter function, the setting unit imposes a limitation on the AF area to reduce the size of a desired AF area to an AF area where the difference in the barycentric position becomes a predetermined amount.

9 Claims, 12 Drawing Sheets

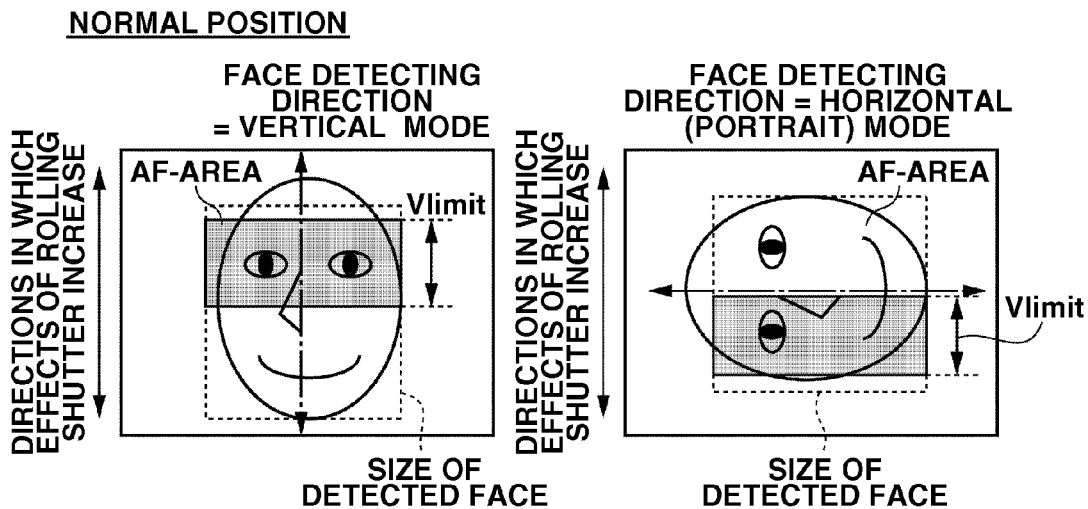
FIG.8A NORMAL POSITION
FIG.8B
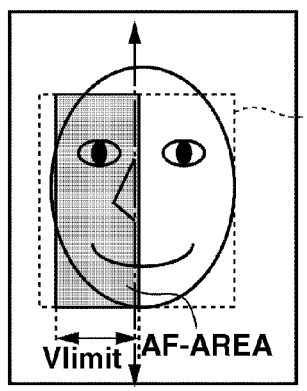
FIG.8C HORIZONTAL POSITION
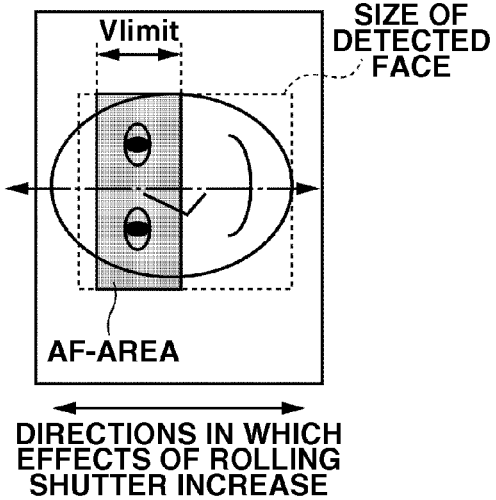
FIG.8D

FIG.12A
WHEN CALCULATION WAS PERFORMED IN SINGLE AF-AREA

PRIOR ART

FIG.12B
WHEN CALCULATION WAS PERFORMED IN SEGMENTED PORTIONS OF AF-AREA

PRIOR ART

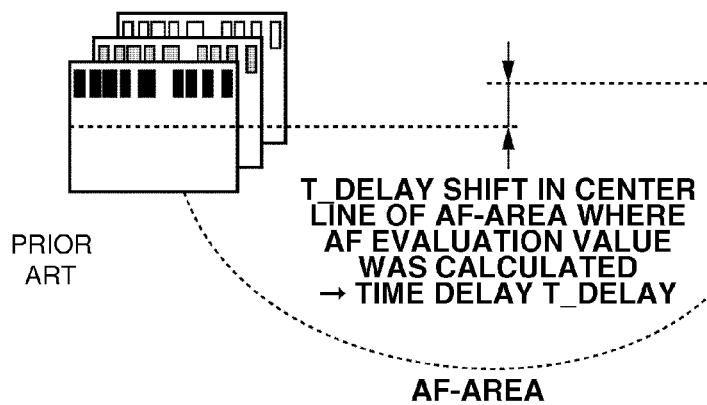
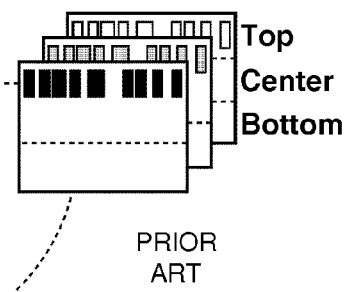

T_DELAY SHIFT IN CENTER LINE OF AF-AREA WHERE AF EVALUATION VALUE WAS CALCULATED
→ TIME DELAY T_DELAY

AF-AREA

FIG.12C
RELATION BETWEEN AF EVALUATION VALUES AND BARYCENTRIC POSITION

PRIOR ART

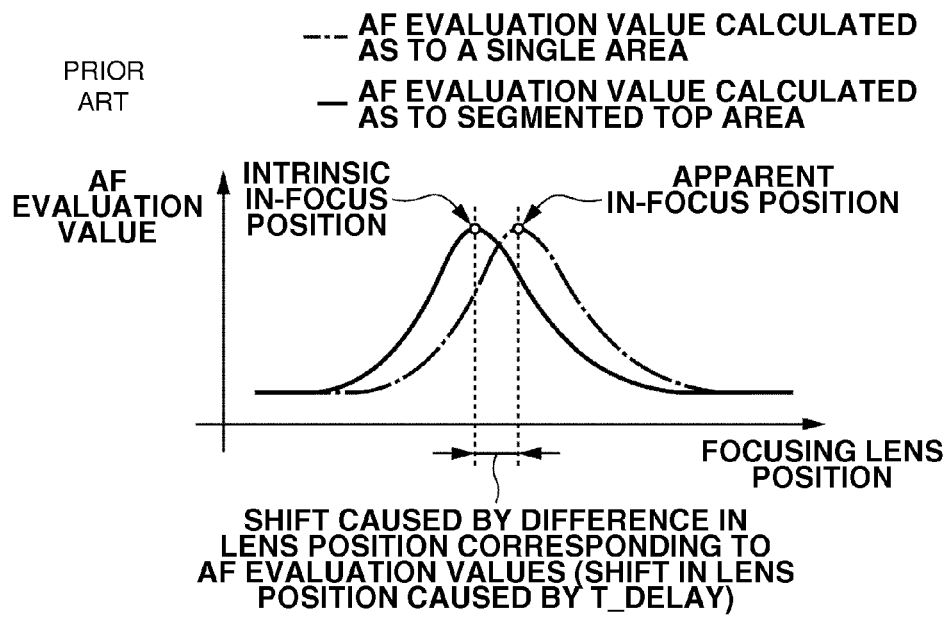

--- AF EVALUATION VALUE CALCULATED AS TO A SINGLE AREA
— AF EVALUATION VALUE CALCULATED AS TO SEGMENTED TOP AREA

AF EVALUATION VALUE

INTRINSIC IN-FOCUS POSITION

APPARENT IN-FOCUS POSITION

FOCUSING LENS POSITION

SHIFT CAUSED BY DIFFERENCE IN LENS POSITION CORRESPONDING TO AF EVALUATION VALUES (SHIFT IN LENS POSITION CAUSED BY T_DELAY)

IMAGING APPARATUS AND CONTROL METHOD

BACKGROUND OF THE INVENTION

1. Field of the Invention

The present invention relates to a focus adjustment technique. More specifically, obtaining an optimum in-focus position when focus adjustment is performed based on an image signal from an image sensor.

2. Description of the Related Art

Conventionally, as an imaging control method for a CMOS image sensor, there is an electronic shutter control method called the rolling shutter. In a shooting operation with the rolling shutter, a plurality of pixels arranged two-dimensionally are sequentially scanned in small units, such as row by row, to read electric charge from the pixels and reset the pixels. After the lapse of a predetermined period of time (charge accumulation time or exposure time) that starts immediately after the reset of the pixels, the pixels are scanned again in the same way as the pixels were reset, so that the electric charge is read from the pixels, and the read charge (image signal) is output. When a moving image is captured, the above operation is performed in one-frame periods.

When shooting a photo with the rolling shutter described above, a time difference occurs between image capturing timing of the first row of pixels and of the last row of pixels. Therefore, in an image of one frame, the scenes having the time difference between the top row and the bottom row coexist.

Meanwhile, a method of an auto focus operation is well known, which moves the focusing lens to a plurality of positions and captures images and determines an in-focus position based on a series of AF evaluation values obtained by an arithmetic operation of an image signal. This method is divided into two types: one type stops the focusing lens after the lens has been moved, and then captures an image, and another type captures images while moving the lens continuously. A problem with the former type is that it takes time because before you take a photo and you have to wait for the lens to stop. Therefore, the latter is advantageous for speed-up of auto focusing.

In the latter type, it is necessary to determine a lens position corresponding to auto focus (AF) evaluation value. As a concrete example, a method is well known which obtains a barycentric position of the center line in an AF area by performing a correction calculation based on a drive time of the optical system, a size of the AF area on the image sensor, and an exposure time (Japanese Patent Application Laid-Open No. 2007-267278, for example).

However, if the latter method is adopted, the image sensor, which shows a difference in timing for charge accumulation in different AF areas, produces a negative effect as follows.

When a contrast difference is large between the upper and lower portions of the image in the AF area, the following problem arises. FIG. 12A illustrates a case where an AF evaluation value and a barycentric position of the AF area in a single AF area are calculated. FIG. 12B illustrates a case where in order to calculate an AF evaluation value and a barycentric position around the area where intrinsically there ought to be a contrast, the inside of the AF area is divided into sections and an AF evaluation value and a barycentric position are calculated for each section.

When AF evaluation values are calculated while moving the lens continuously, as shown in FIG. 12C, as usual, there are differences in the correspondence relation between the AF evaluation values and the barycentric positions obtained in the single AF area, and the AF evaluation values and the barycentric positions calculated in the vicinity of the area where there is a contrast. This is attributable to differences in the position of the lines used for calculation of the barycentric positions and also to the influence of the rolling shutter, which are difficult to avoid, in principle.

In other words, a time lag becomes large between an intrinsic in-focus position and an in-focus position indicated by actual AF evaluation values, depending on the size of the AF area and the contrast of the image in the AF area, a degree of time lag in charge accumulation due to the rolling shutter, or a moving speed of the lens when the lens is moved continuously. This leads to a worsening of the focusing accuracy of auto focus.

SUMMARY OF THE INVENTION

An embodiment of the present invention is directed to improving a focusing accuracy when auto focus control is implemented while the focusing lens is moved continuously by using an image sensor which shows a time lag in charge accumulation timing between different positions in an AF area.

According to an aspect of the present invention, an imaging apparatus includes an imaging unit having a plurality of pixels arranged two-dimensionally and configured to obtain an image of an object by sequentially scanning a plurality of pixels to read out an image signal from each pixel while moving the position of a focusing lens; a detection unit to detect an object area in an image obtained by the imaging unit; a setting unit to set an AF area to be corresponding to the object area detected by the detection unit; and a focusing control unit configured to obtain in-focus states of a plurality of images in the AF area set by the setting unit, the plurality of images being captured by the imaging unit, and based on information about the in-focus states, perform focusing control of the focusing lens.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 8A through 8D are diagrams illustrating the relation among an image capturing posture, a big face detection result, and setting of the AF area according to an exemplary embodiment.

FIGS. 12A through 12C are diagrams illustrating the relation between an apparent in-focus position and an intrinsic in-focus position based on the relation between the states of contrast in the AF area and the barycentric positions.

DESCRIPTION OF THE EMBODIMENTS

Various exemplary embodiments, features, and aspects of the invention will be described in detail below with reference to the drawings.

Figure 1:
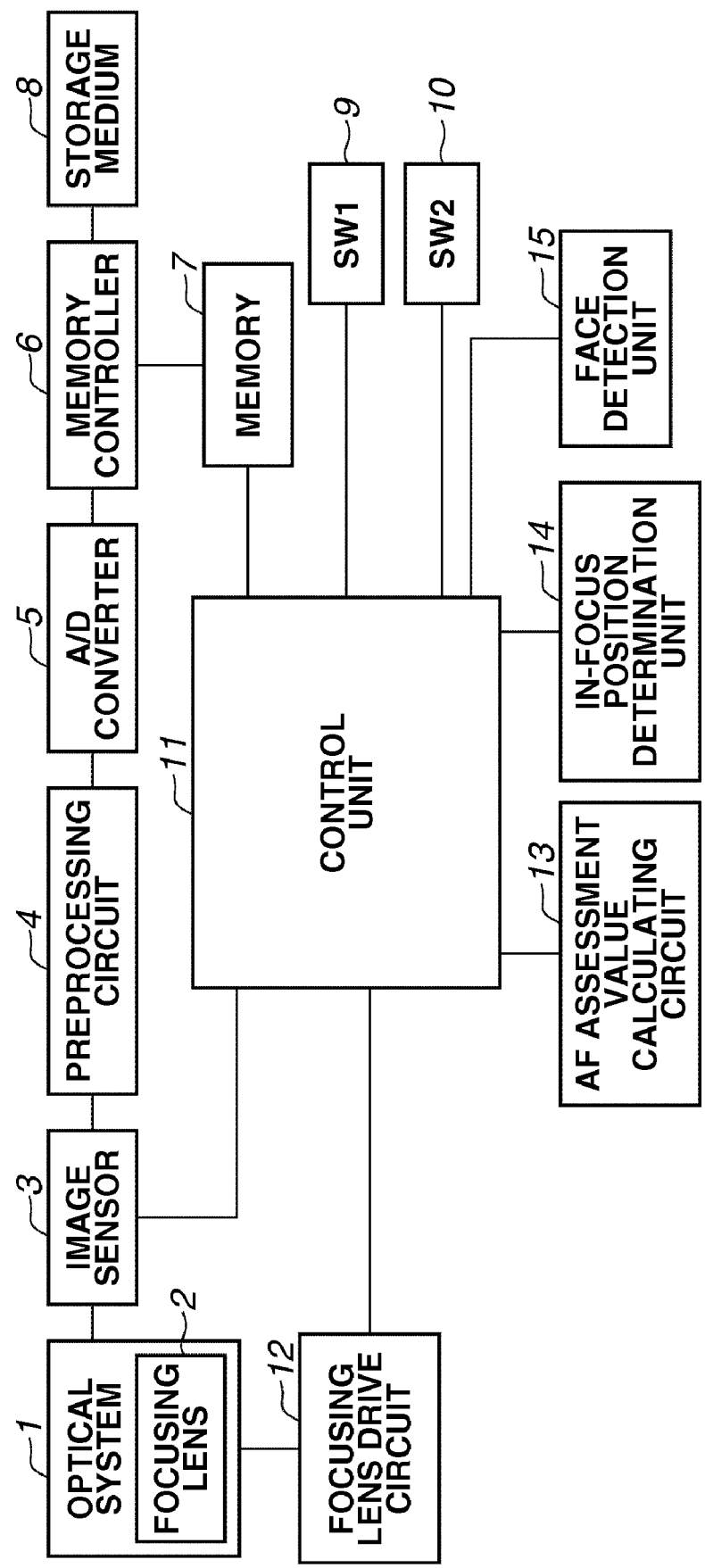
FIG. 1 is a block diagram illustrating a schematic functional structure of a digital camera according to an exemplary embodiment of the present invention.

FIG. 1 is a block diagram of a digital camera as an example of an imaging apparatus including an auto focus (AF) function.

A camera according to an exemplary embodiment, which is provided with an optical system 1, including a focusing lens 2, photo-electrically converts, by an image sensor, light of a focused image from the optical system 1 into an image signal (pixel signal) and outputs the signal. The image sensor 3 used here is a CMOS sensor, for example, which has a plurality of pixels, each including a photoelectric conversion element, arranged in a matrix form (in a two-dimensional array of rows and columns). The image sensor is driven by a rolling shutter method.

In an image capturing operation by the rolling shutter, a plurality of pixels arranged two-dimensionally are scanned in small units, for example, row by row to read electric charge from each pixel and reset each pixel. Immediately after the rest, the light from an object is received and the light undergoes photoelectric conversion, and after the lapse of a predetermined time (charge accumulation time or exposure time), the plurality of pixels is scanned again in row units in the same manner as when they were reset, thereby reading a charge from each pixel, and the read charge (image signal) is output.

Figure 2:
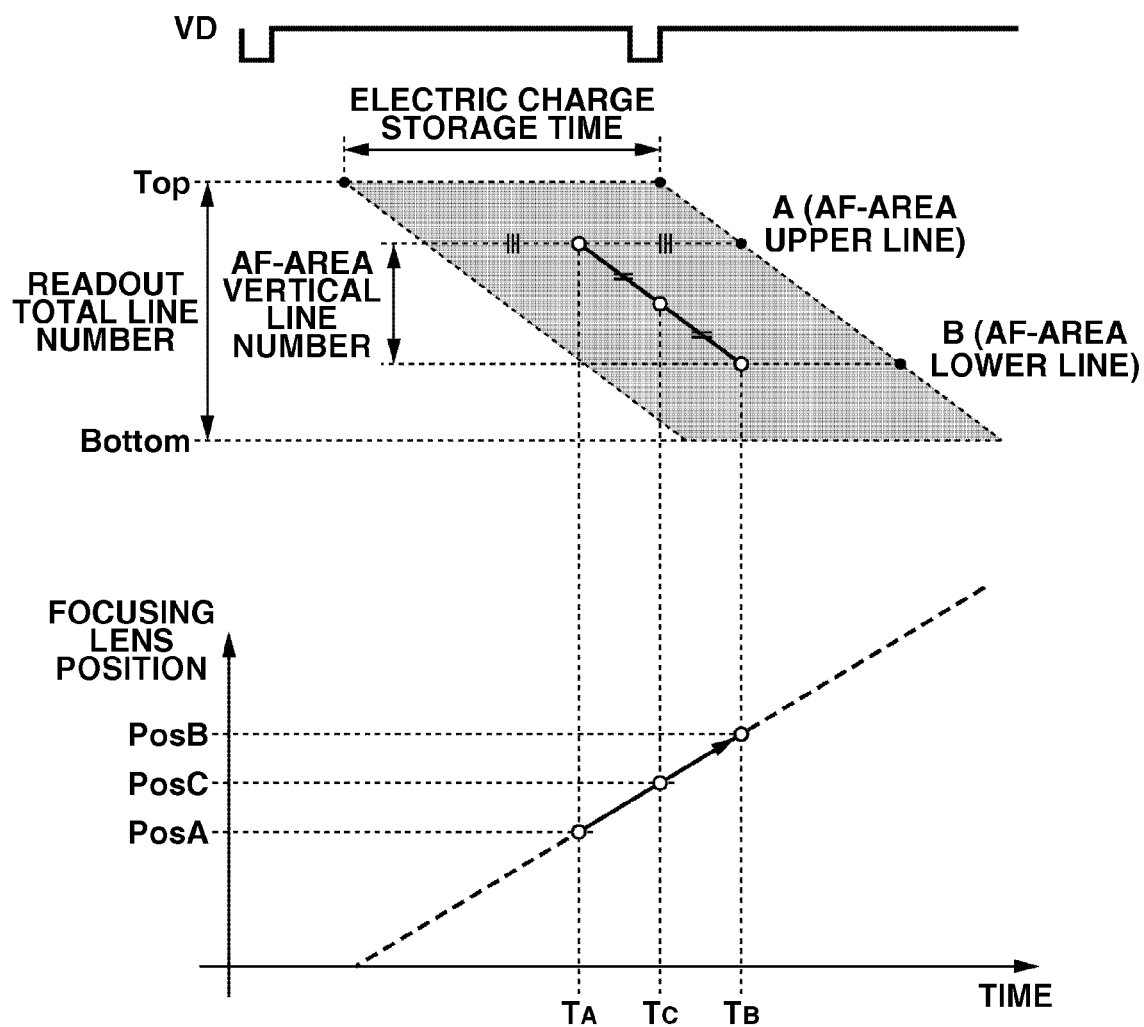
FIG. 2 illustrates a time lag of a barycentric position in the AF area due to an influence of the rolling shutter when the focusing lens is moved continuously.

When capturing a moving image, the operation described above is performed in one-frame periods. As illustrated in FIG. 2, in this case, images are captured while moving the lens continuously. When a barycentric position is found in the center line of the AF area, differences in image capture timing occur according to different positions of the area in the screen due to the influence of the rolling shutter. This is because the barycentric positions of the center line, an upper line and a lower line of the AF area are at different positions, PosC, PosA, and PosB (FIG. 2).

In this embodiment, it is assumed that the rolling shutter function has the effects in the vertical (landscape) direction of the camera when the camera is in the normal position (reference position). An output image signal is processed by a correlated double sampling (CDS) circuit and a pre-processing circuit, which includes a nonlinear amplifier circuit to process the image signal before the image signal is sent for A/D conversion. Then, the image signal is converted into a digital form by the A/D converter 5, then passes through a memory controller 6, and the signal is stored in a memory 7, and converted into image data in an optional format by a signal processing circuit (not illustrated), and recorded in a storage medium.

A focusing operation is controlled by a control unit 11. The control unit 11 drives a focusing lens 2 via a focusing lens drive circuit 12 to move it to a plurality of lens positions to capture images. The control unit 11 instructs an AF evaluation calculation circuit 13 to calculate a signal (AF evaluation value) representing an in-focus state according to image contrast using an image signal in the AF area captured by the image sensor 3. Next, based on a calculated AF evaluation value, an in-focus position determination circuit 14 determines an in-focus position, which is a lens position where the AF evaluation value is at a maximum. After that, the control unit 11 controls to drive the focusing lens 2 to this position. In this manner, focusing control is completed. When SW1 (9) including an operation member is operated, the above-described focusing operation is performed. When SW2 (10) including an operation member is operated, actual photographing is carried out.

Using an image signal obtained by the image sensor 3, a face detection unit 15 extracts features (eyes, for example) of a human face, identifies a face orientation relative to a picture plane, and on the basis of obtained data, detects a human face. Information about a detected face is used to determine an AF area during an AF operation.

According to an exemplary embodiment, the calculation of an AF evaluation value is carried out as follows.

A band-pass filter for the horizontal direction is applied, at every horizontal line, to a luminance signal of an image signal obtained by the image sensor 3, in a preset AF area, and a luminance signal of a predetermined frequency component is extracted. Then, from the luminance signal extracted from each horizontal line, a luminance signal with a largest absolute value is selected, and selected luminance signals are integrated in a vertical direction. A value obtained by integrating the luminance signals is taken as an AF evaluation value. By detecting luminance signals with high contrast in the horizontal direction and integrating those luminance signals along the vertical direction, an S/N ratio of the signal can be improved.

An AF evaluation value obtained as described is at a maximum value when an image is in the in-focus state, but its value decreases in a defocused state. Therefore, by driving the focusing lens 2 to a position where the AF evaluation value is at a maximum and capturing an image, a focused image can be obtained.

Figure 3:
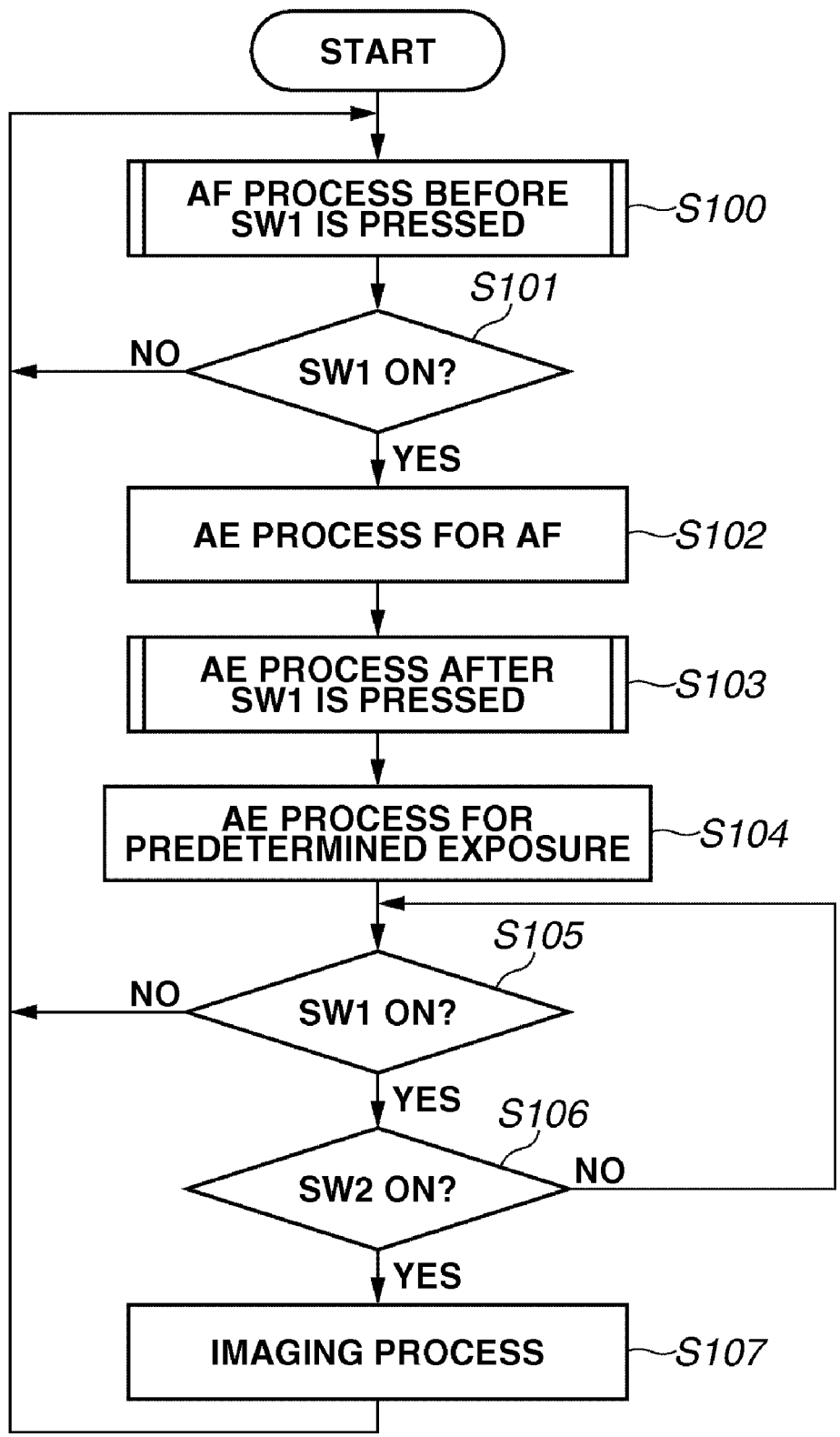
FIG. 3 is a flowchart illustrating a basic operation flow of the digital camera according to an exemplary embodiment.

FIG. 3 is a flowchart illustrating shooting preparations and an actual shooting operation of a digital camera according to a first exemplary embodiment of the present invention.

In step S100, an AF process preceding SW1 operation is carried out. In a digital camera according to this embodiment, even before SW1 is operated, an AF operation is performed according to an in-focus state. Details of an AF process performed before SW1 is operated in step S100 will be described later.

In step S101, the state of SW1 (9) is checked. If it is found that SW1 has turned ON (YES in step S101), the process advances to step S102. Or, if SW1 is OFF (NO in step S101), the process returns to step S100. In step S102, the control unit 11 performs an AF process using an image signal output from the image sensor 3. By this process, the exposure conditions, including the diaphragm and the electronic shutter, are set to be suitable for an AF operation. In step S103, an AF operation subsequent to SW1 operation is performed.

After the shooting position of the focusing lens has been decided in step S103, an AF process for actual shooting is carried out in step S104. Though an AF process has been performed in step S102 to obtain exposure conditions suitable for an AF operation in step S103, a diaphragm condition and a shutter speed are set as exposure conditions suitable for an actual shooting.

Then, in step S105, the state of SW1 (9) is checked, and if it is found out that SW1 (9) is turned ON (YES in step S105), the process advances to step S106, and if SW1 (9) is not turned ON (NO in step S105), the process returns to step S100. In other words, if SW1 is opened up to this point in the process, the shooting preparations are cancelled.

If SW1 is turned ON, in step S106, the state of SW2 (10) is checked. If SW2 is turned ON (YES in step S106), the process proceeds to step S107. If SW2 is OFF (NO in step S106), the process moves on to step S105. In other words, also if SW1 has been and is OFF before SW2 turns ON, the shooting preparations, which have been done, are cancelled. In step S107, a shooting process is carried out at an actually decided focusing lens position. When all the steps of the shooting process are completed, the process returns to step S100. The basic operation of a digital camera in this exemplary embodiment has been described.

An AF process, performed before SW1 is operated in step S100 in FIG. 3, is described below referring to the flowchart in FIG. 4.

A monitoring operation is performed in step S200. In step S200, when any one of the following conditions is established, it is assumed that some change has occurred in the scene (YES) in the next step S201 and the process enters an auto focus mode (AF operation) starting with step S202 and in subsequent steps.

(1) When the digital camera has just been started
(2) When an AF evaluation value obtained by taking over the AF area of the immediately preceding AF operation is stored and the current AF evaluation value shows a change equal to or larger than a predetermined level compared with the immediately preceding AF evaluation value.

The immediately preceding AF area for any change means an AF process before or after the operation of SW1 or SW2.

In other words, just after the digital camera is started, the focus is adjusted once without fail. Besides this, the object is monitored for any change in the AF area while comparing the AF evaluation value in the previous period with the current evaluation value.

In step S201, if it is determined that there is no change (NO in step S201), the process is terminated. On the other hand, if it is determined that there has been some change (YES in step S201), in the next step 202, a drive condition for adjusting the focus is decided. A search range and a focusing lens drive speed in sampling AF evaluation values are decided while associating the AF evaluation value with the focusing lens position by a scanning operation of the digital camera.

In step S203, an AF area setting process to calculate AF evaluation values (AF area control process) is performed. Details of the setting process will be described later.

In step S204, in accordance with the range decided in step S202, the focusing lens is moved to a start position of the range decided in step S202. In this exemplary embodiment, the start position is the lens position corresponding to infinity.

Then, in step S205, the scanning operation is carried out toward a scanning end position in accordance with the search range and the drive conditions decided in step S202.

When, in step S205, the scanning operation has been completed in the predetermined range and a plurality of AF evaluation values and the corresponding focusing lens positions have been obtained, in step S206 in-focus positions are calculated from the AF evaluation values and the focusing lens positions obtained in the preceding step.

As described above, an AF evaluation value tends to be largest when the image is in-focus state and tends to be small when the image is in defocused state. In-focus positions are calculated by using data close to maximum of obtained AF evaluation values. Those in-focus positions are specified as shooting positions.

Meanwhile, it often happens that maximum values cannot be detected adequately when the contrast of an image in an AF area is low or the illuminance is low. In such a case, a predetermined object distance is used as a shooting position.

After a shooting position has been decided in step S206 as described, in step S207 the focusing lens is moved to the shooting position decided in step S206.

With the above, an AF process performed before SW1 is operated, has been described.

Next, an AF process after SW1 operation in step S103 in FIG. 3 is described with reference to the flowchart in FIG. 5.

In step S300, a search range and a focusing lens drive speed when sampling AF evaluation values and focusing lens positions while associating AF evaluation values with focusing lens positions by a scanning operation are decided, which will be described later (this sampling is called a scanning operation). In the next step S301, a process of setting AF areas to calculate AF evaluation values (an AF area control process) is performed. Details of the process will be described later.

In step S302, the focusing lens is moved to the start position of a range decided in step S300. In this exemplary embodiment, the start position is a lens position corresponding to infinity.

Then, in step S303, a scanning operation is carried out towards the scanning end position in accordance with the range and drive conditions decided in step S200.

When in step S303 the scanning operation has been completed in the predetermined range and a plurality of AF evaluation values and their associated focusing lens positions have been obtained, in the next step 304, in-focus positions are calculated from the AF evaluation values and the focusing lens positions obtained in the preceding step.

As described above, an AF evaluation value is liable to be largest when an image is in an in-focus state but small when an image is in a defocused state. In-focus positions are calculated by using data close to maximum of obtained AF evaluation values. Those in-focus positions are specified as shooting positions.

Meanwhile, it often happens that a maximum value cannot be detected adequately when the contrast of an image in an AF area is low or the illuminance of the scene is low. In such a case, a predetermined object distance is used as a shooting position.

After a shooting position has been decided in step S304 as described above, in step S305 the focusing lens is moved to the shooting position decided in step S304. With the above, an AF process subsequent to SW1 operation has been described.

Figure 6:
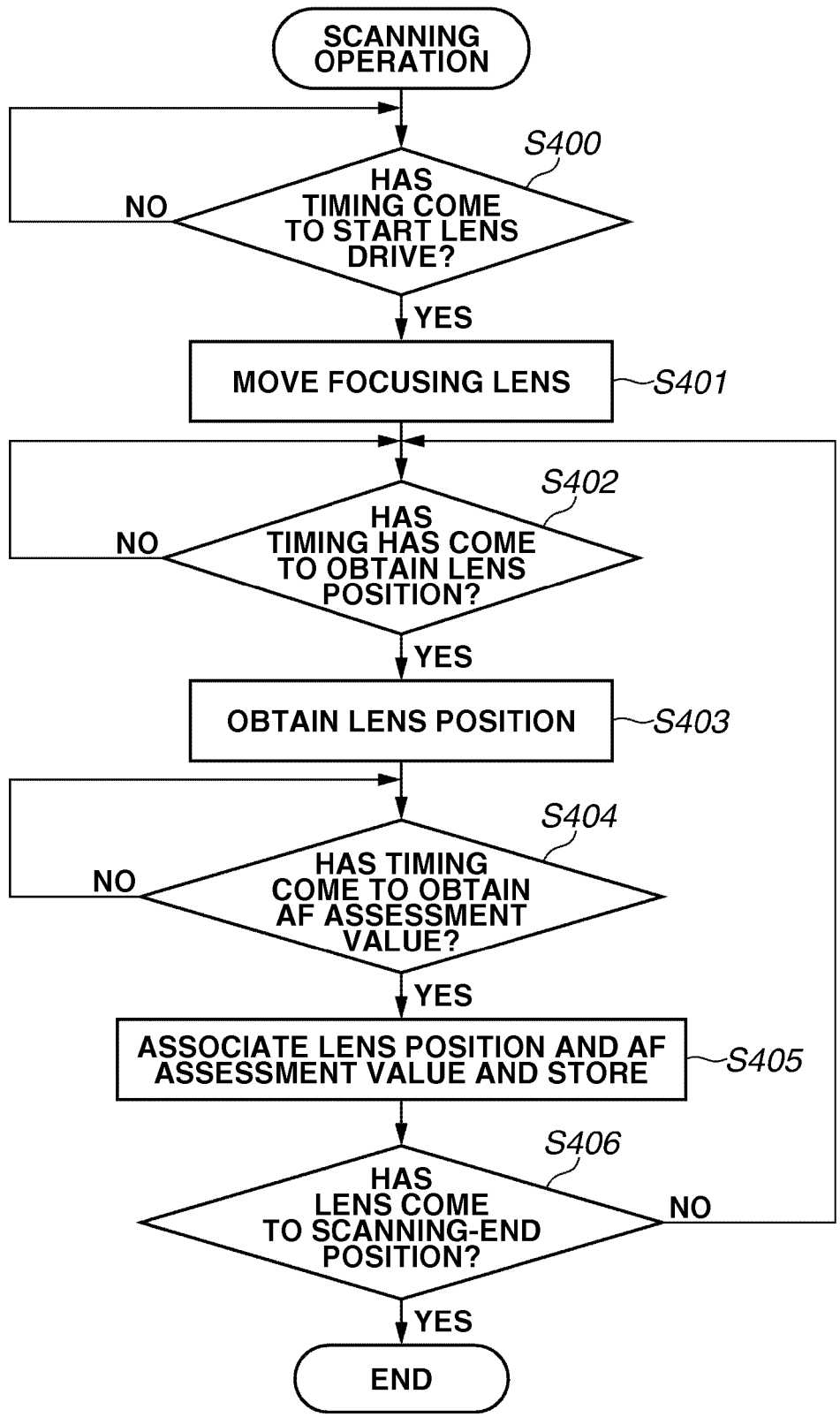
FIG. 6 is a flowchart illustrating a scanning operation of the digital camera according to an exemplary embodiment.

The scanning operation is described with reference to the flowchart in FIG. 6.

In step S400, it is determined whether timing to start driving the focusing lens has come.

Since an AF evaluation value is calculated with a predetermined period by an auto focus evaluation value calculation circuit 13, the movement of the focusing lens is synchronized with the evaluation value calculation period. When next timing to move the focusing lens comes, the focusing lens starts moving in step S401.

At this time, the AF evaluation values are sampled which are calculated periodically while the focusing lens is moved at a predetermined focusing lens speed to maintain necessary accuracy. The speed and the target position of the focusing lens have been determined in step S202 in FIG. 4 and in step S300 in FIG. 5, and the focusing lens, which is started in this process, travels towards the scanning end position.

In step S402, it is determined when timing to obtain the focusing lens position has come. If the timing is not right (NO in step S402), the control unit 11 waits until next timing to obtain the lens position comes. If the timing is right (YES in step S402), in step S403, the focusing lens position at that time is obtained and stored in the memory 7.

In this exemplary embodiment, the timing to obtain the focusing lens position is timing at the center of the exposure time period at the vertical center line in an AF area where an AF evaluation value is calculated. However, it is not always necessary to obtain the lens position at this timing. For example, if a temporal relation between cyclic exposure time periods and timing to obtain the lens position, the size of AF areas, and the controlled speed of the focusing lens are already known, by using those data, the center position of the exposure time period can be counted backward.

Next, in step S404, it is determined whether timing to obtain an AF evaluation value has come. If the timing is right (YES in step S404), the process advances to step S405. In step S405, the focusing lens position obtained before and an AF area obtained this time are associated with each other and stored in the memory 7.

In step S406, it is determined whether the focusing lens has reached the scanning end position. If the lens has not reached the end position (NO in step S406), the process returns to step S402, and an AF evaluation value and the focusing lens position continue to be obtained and associated. On the other hand, if the focusing lens has reached the end position (YES in step S406), the scanning operation is finished.

Figure 4:
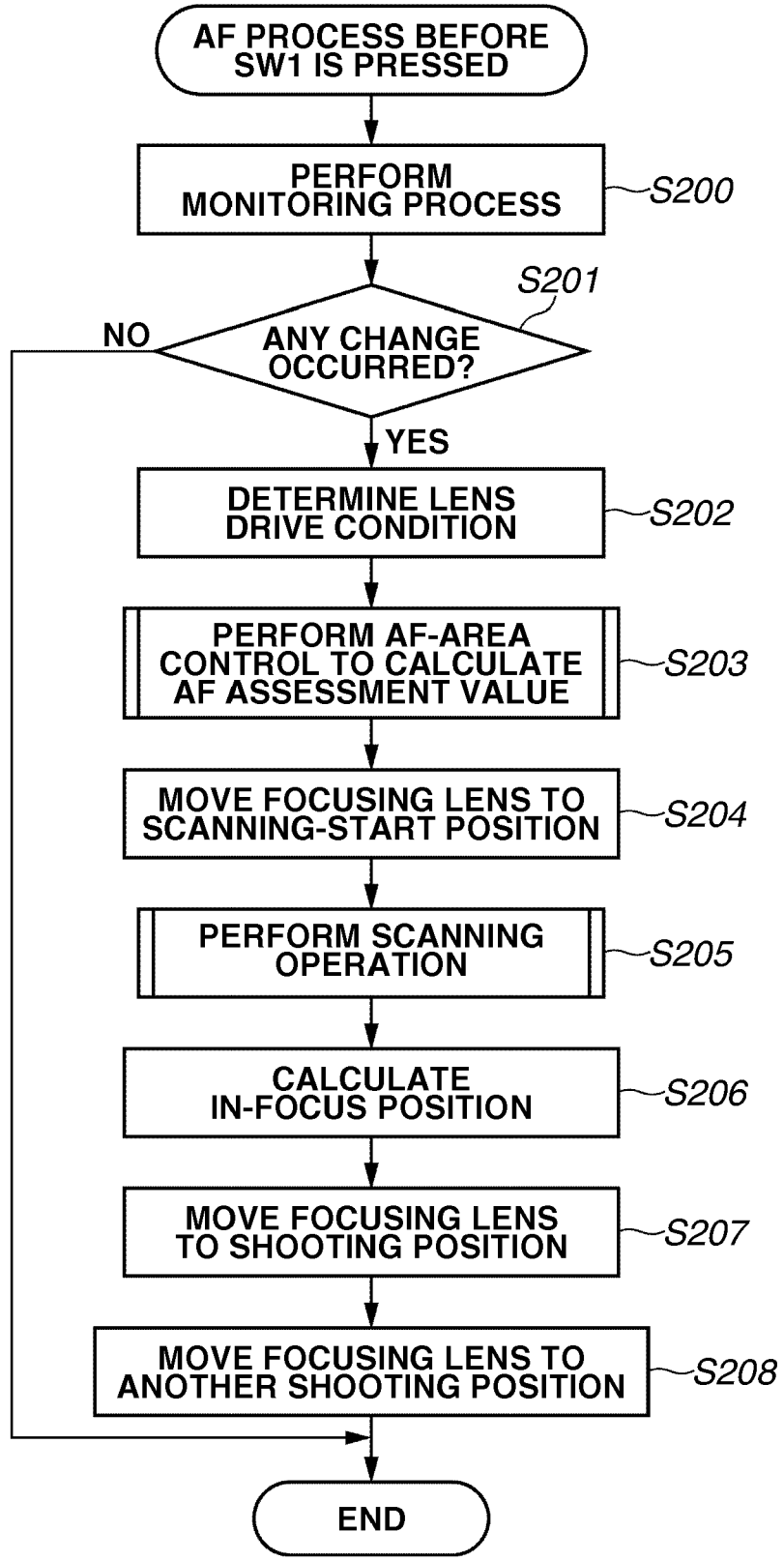
FIG. 4 is a flowchart illustrating an AF operation before pressing SW1 of the digital camera according to an exemplary embodiment.
Figure 5:
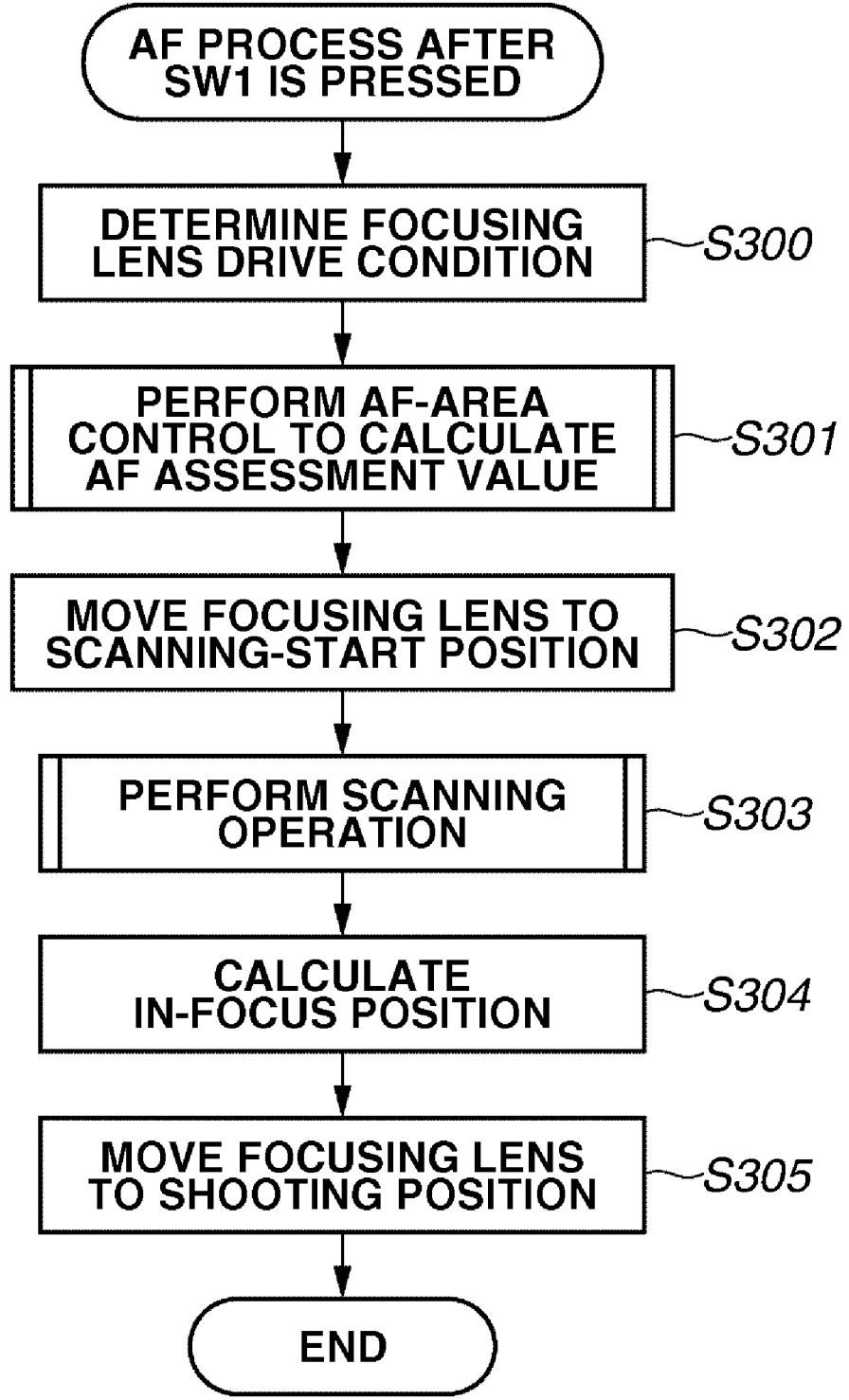
FIG. 5 is a flowchart illustrating an AF operation after pressing SW1 of the digital camera according to an exemplary embodiment.

A plurality of AF evaluation values and their associated lens positions within the limits determined in step S202 in FIG. 4 and in step S300 in FIG. 5 can be obtained at predetermined intervals by the scanning operation.

Next, the AF area control process described referring to step S203 in FIG. 4 and step 301 in FIG. 5 is described below based on FIG. 7. In this process, setting of AF areas is controlled adequately according to modes and states of the digital camera.

In step S500, it is determined if the digital camera is in multi-frame AF mode.

If the digital camera is in multi-frame AF mode (YES in step S500), a predetermined number of AF areas are set at predetermined positions in an image, and an AF process is performed. Therefore, if the digital camera is in multi-frame AF mode in step S500, in step S517 AF areas of a specified size are selected in specified positions, and in step S516, selected settings of AF areas are entered in the AF evaluation value calculation circuit 13.

On the other hand, if the camera is not in multi-frame AF mode (NO in step S500), in the next step S501, it is determined whether the digital camera is in face AF mode.

When the digital camera is not in face AF mode (NO in step S501), the camera enters a mode to set only one AF area in the center of the image. In this case, in step S517, information about a size and a position of an AF area, which are determined fixedly, is selected and in step S516, and related settings are entered in the AF evaluation value calculation circuit 13.

On the other hand, if the camera is in face AF mode (YES in step S501), in step S502, it is determined whether a face is detected.

If the face AF mode is selected (YES in step S502), a face detection process is performed by the face detection unit 15 illustrated in FIG. 5 by using an image signal output from the image sensor 3. If a face is not detected (NO in step S502), the digital camera enters a mode to set only one AF area in the center of the screen image, which has been described above.

On the other hand, if a face is detected, in step S503, a threshold number of vertical lines of the AF area is calculated. This process obtains an optimum number of vertical lines in an AF area in order to suppress effects of the rolling shutter function. Details of this process will be described later.

Then, in step S504, information about a face detected by the face detection unit 15 is obtained. Obtained information includes a size and a position of the face, positions of the eyes, and the face orientation with respect to the image screen (i.e., whether the face is vertical (landscape) or horizontal (portrait) to the screen).

In step S505, it is determined whether the position of the detected face is horizontal or not relative to the normal position of the screen. In this embodiment, the influence of the rolling shutter on the image is exerted in the vertical direction of the image screen relative to the normal position. This judgment is made to determine whether to limit the image data in the longitudinal direction or in the transverse direction of the detected face by taking into account the directions in which an image is influenced by the rolling shutter and the face orientation.

In this process, when the detected face is vertical relative to the normal position of the image screen (FIGS. 8A and 8D) (NO in step S505), in step S506, a number of horizontal lines and a number of vertical lines of the AF area are set. In this case, the number of horizontal lines constitutes the transverse width and the number of vertical lines constitutes the vertical length of the detected face.

Figure 9:
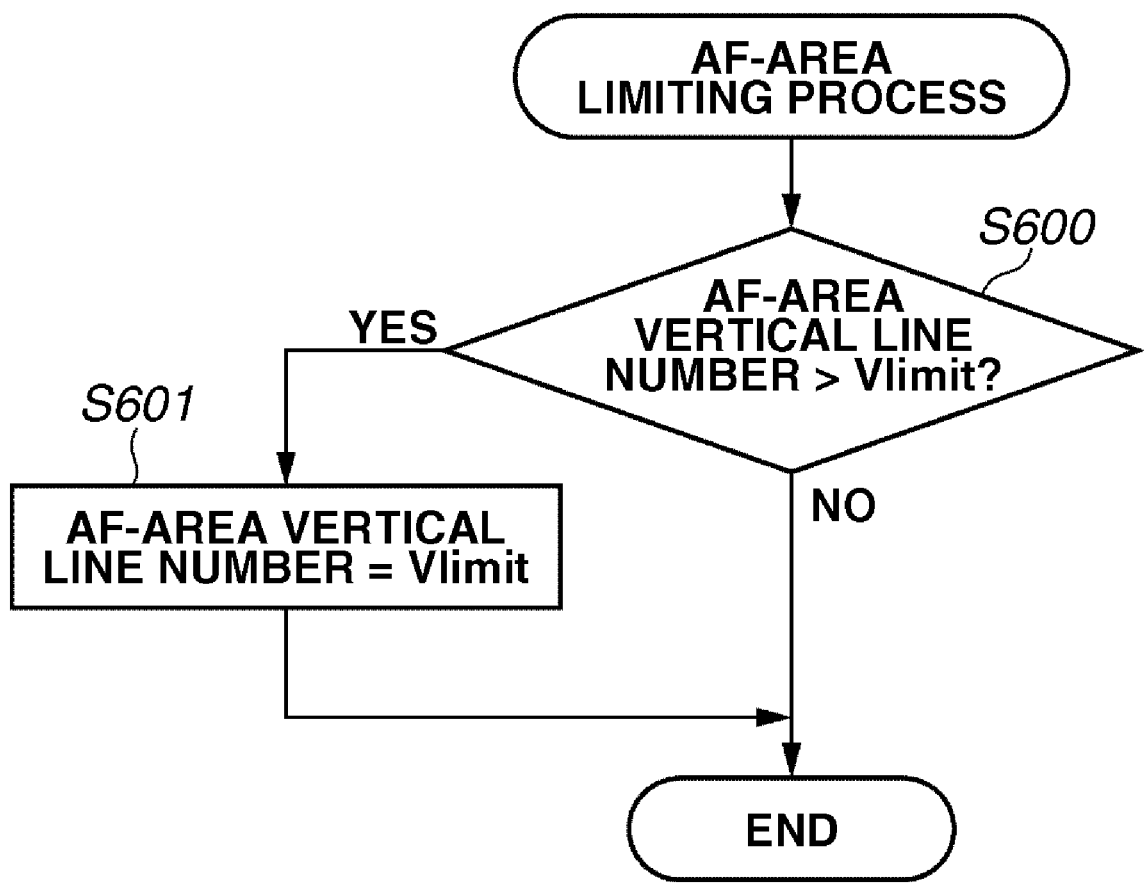
FIG. 9 is a flowchart illustrating the AF area limiting process of the digital camera according to an exemplary embodiment.

Then, in step S507, an AF area limiting process is executed. As illustrated in FIG. 9, it is determined in step S600 whether the number of vertical lines of the AF area is larger than the threshold value Vlimit. The threshold value Vlimit is obtained by the calculation of a vertical line number in the AF area in step S503 in FIG. 7, and its details will be described later.

If the number of vertical lines is smaller than the threshold value (NO in step S600), the immediately previously set number will be used. On the other hand, if the set number of vertical lines of the AF area is larger than the threshold value (YES in step S600), in step S601, the number of vertical lines in the AF area is clipped to the threshold value.

Thus, in the AF area limiting process illustrated in FIG. 9, the AF area in the vertical direction, which is influenced by the rolling shutter function, is limited so that it does not become larger than a predetermined size.

Returning to FIG. 7, in step S508, it is determined whether a limitation has been imposed on the AF area in step S507. If it is found in step S508 that the AF area has been limited (YES in step S508), in step S510, a reference position in the vertical direction of the AF area is set at an intermediate position (vertical direction) between the two eyes of the detected face (FIGS. 8A and 8D).

Figure 10:
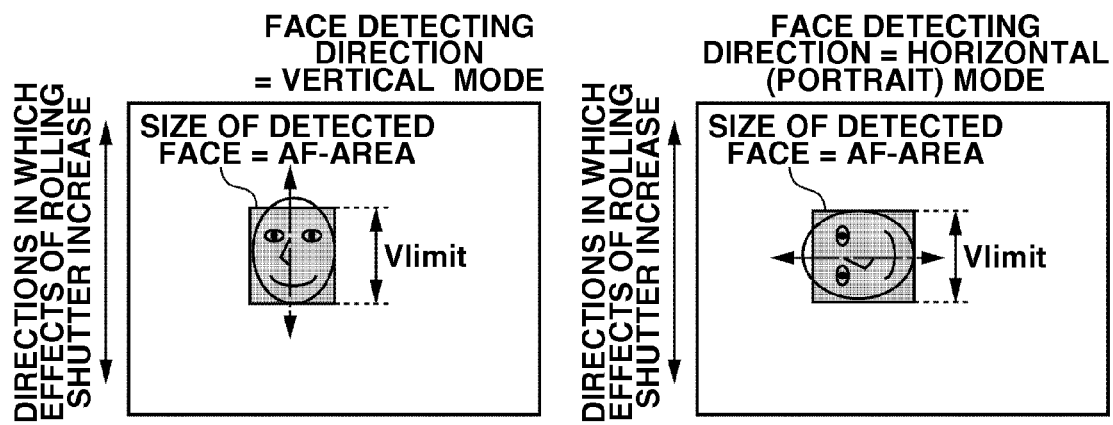
FIG. 10 is a diagram illustrating the relation among the image capturing posture, the big face detection result, and setting of the AF area according to an exemplary embodiment.

On the other hand, if it is found in step S508 that the AF area has not been limited (NO in step S508), in step S509, the position where the face was detected is determined as the reference position in the vertical direction of the AF area (FIG. 10) as it is.

Next, in step S515, the position of the AF area in the image screen is adjusted according to the reference position in the vertical direction of the AF area, and in step S516, and settings of the AF area are made in the AF area evaluation value calculation circuit 13.

As illustrated in FIGS. 8A and 8D, if the face orientation on the image sensor is the same as the direction on the image sensor in which a difference in readout timing occurs, an AF area is set to be limited to include both eyes of a person.

On the other hand, as illustrated in FIGS. 8B and 8C, the face orientation on the image sensor is different from the direction on the image sensor in which a difference in readout timing occurs, an AF area is set to be limited to include at least the left eye or the right eye of a person (the right eye in FIGS. 8B and 8C).

If it is determined in step S505 that the detected face is horizontal relative to the normal position of the image screen (YES in step S505), the process advances to step S511.

In step S511, a number of horizontal lines and a number of vertical lines of the AF area are set. In this case, the number of horizontal lines constitutes vertical length and the number of vertical lines constitutes the transverse width of the detected face.

Then, in step S512, the AF area limiting process is performed. This process is illustrated in FIG. 9, and its description is omitted.

If the AF area has been determined to have been limited (YES in step S513), in step S514, the position of the detected right eye (vertical direction) is set as the reference position in the vertical direction of the AF area (FIGS. 8B and 8C).

On the other hand, if the AF area has been determined to have not been limited (NO in step S513), in step S509, the position where the face was detected is determined as the reference position in the vertical direction of the AF area (FIG. 10) as it is. The subsequent process is same as described above.

Thus, in the multi frame AF mode or in the AF mode having only one AF area in the center of the image screen, a size of an AF area is to be previously determined considering the influence of the rolling shutter function. In the face AF mode, an appropriate size of an AF area is controlled in accordance with the size and the direction of a detected face.

Figure 7:
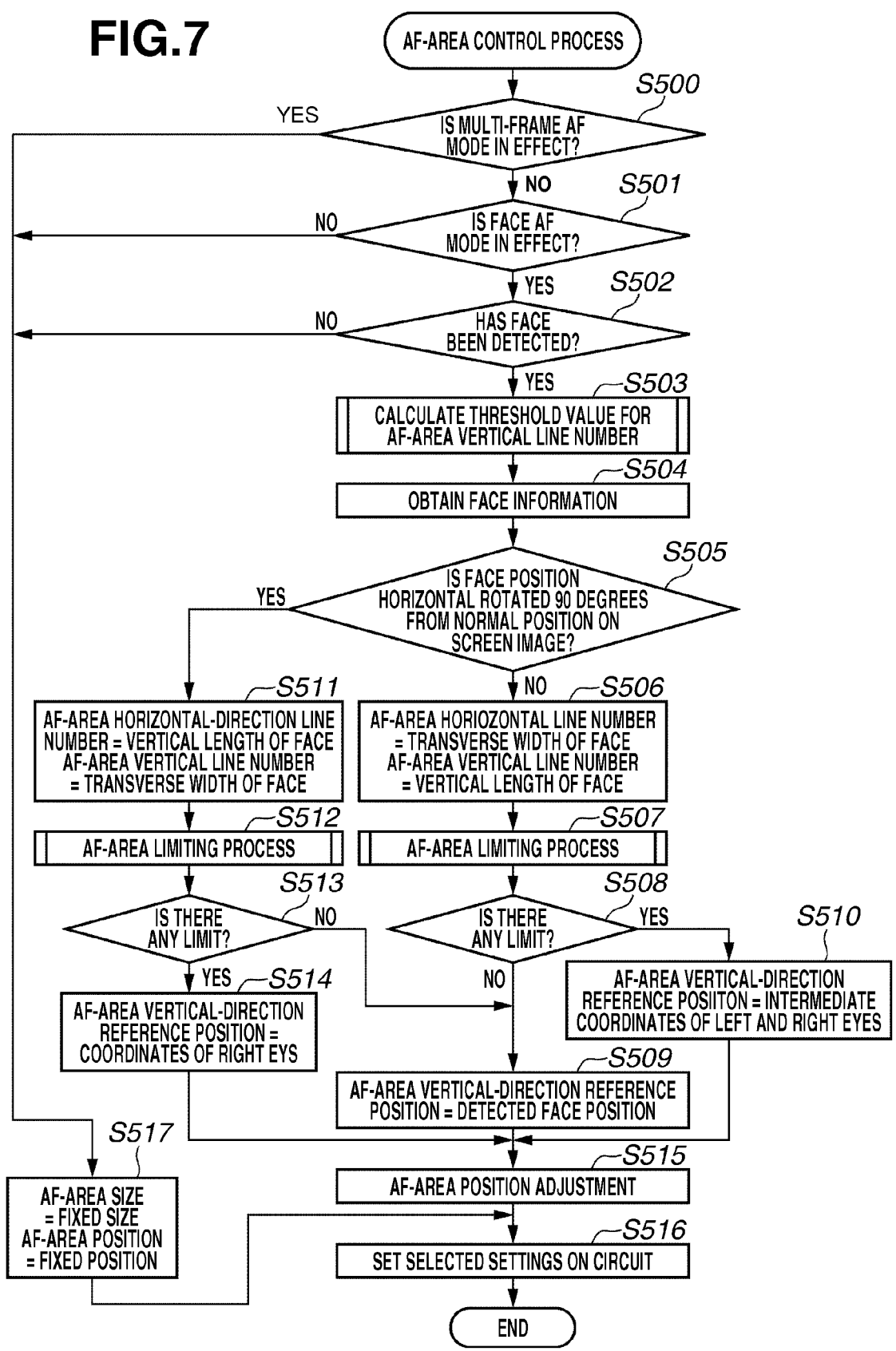
FIG. 7 is a flowchart illustrating an AF area control process of the digital camera according to an exemplary embodiment.
Figure 11:
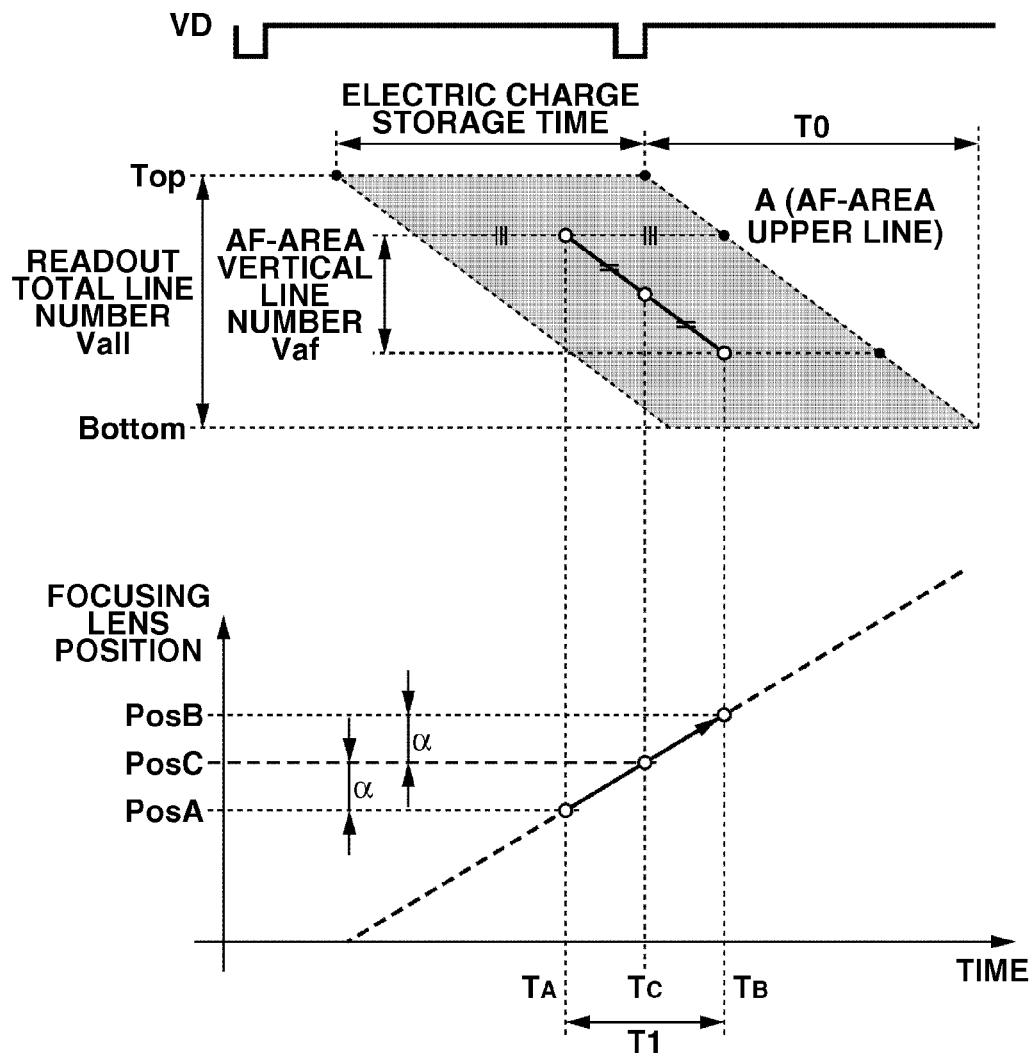
FIG. 11 is a diagram illustrating an allowance calculation method when the AF area is limited according to an exemplary embodiment.

The AF area control process discussed referring to step S503 in FIG. 7 is described in detail using FIG. 11.

An amount of time lag of the lens position resulting from a difference between an upper line and a lower line of the AF area due to the rolling shutter function is denoted as α pls, which is set as a pulse corresponding to a single-side depth of focus in this exemplary embodiment. When this time lag amount α is decided, a size of an AF area in the vertical direction in which an image is influenced by the rolling shutter function is determined as follows.

Focusing lens drive speed: Speed pps
Allowable time lag amount: α pls
A time lag in reading vertical lines of an AF area: T1 sec
Time taken in reading all vertical lines: T0 sec
A number of auto-focus-area vertical lines: Vaf
A number of all lines read out: Vall
T1=2×α/Speed
T0:Vall=T1:Vaf
Threshold value of vertical lines in the AF area Vlimit=Vaf The focusing lens drive speed is decided in step 202 in FIG. 4 and in step S300 in FIG. 5. Time T0 taken in reading all vertical lines and Vall, the number of all lines read out, are decided by a method of driving an image sensor to be used. Vaf is calculated by an equation shown above and Vlimit, a threshold value of vertical lines in the AF area, is calculated. According to this threshold value Vlimit of vertical lines in the AF area, the size of a too large AF area is limited to Vlimit by the auto-focus area limiting process indicated in FIG. 9, and the AF area is controlled so that a specified focusing accuracy can be maintained.

As has been described, even in a case where an AF area may originally become large as in an AF operation that uses a face detection result, the influence of a time lag that occurs in timing of electric charge accumulation can be suppressed and focusing accuracy can be enhanced.

An example of a basic operation (photographing of a still image) has been described in the first exemplary embodiment. It is sometimes desirable to change over between the validity and invalidity of the limitation on the AF area according to the mode or the AF operation state of the digital camera.

In a case where the user is tracking a moving object in an AF process performed before SW1 is operated, for example, it is sometimes desirable to continuously track an object without limiting the AF area instead of maintaining the focusing accuracy by limiting the AF area. In the second exemplary embodiment, an implementation method for this case is described referring to the flowchart used in the first exemplary embodiment.

More specifically, in step S517 in FIG. 7, in an AF process before SW1 is operated, if the AF area limiting process in FIG. 9 has been executed, an AF area is set without considering the influence of the rolling shutter function. Similarly, in a case of the AF area limiting processes S512 and S507 performed before SW1 is operated, by placing limitation on the AF area, a high focusing accuracy can be obtained.

By controlling the limitation on the AF area as described above, control of the AF area size can be achieved while priority is placed on the object tracking ability in an AF process performed before SW1 operation, for example. Meanwhile, in an AF process performed after SW1 operation, the focusing accuracy can be improved by imposing a limitation on the AF area.

Therefore, even when an image sensor is used which shows a time lag in electric charge accumulation in the AF area, the usefulness for the photographer can be improved.

In the above exemplary embodiments, though as an example, as to the features of an object, a face of a person is used as an object detected by the face detection unit 15, an animal or a car, other than a human face, may also be used as an object. Moreover, an object can be detected by inputting and specifying a position in the image screen via an external input device, or by detecting the line of sight of the photographer, who is looking into the finder.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-236309 filed Sep. 16, 2008, which is hereby incorporated by reference herein in its entirety.

What is claimed is:

1. An imaging apparatus comprising:
    an imaging unit having a plurality of pixels arranged two-dimensionally in a row direction and a column direction and configured to obtain an image of an object by sequentially scanning a plurality of pixels to read out an image signal while moving the position of a focusing lens;
    a detection unit to detect an object area in an image obtained by the imaging unit;
    a setting unit to set an AF area corresponding to the object area detected by the detection unit; and
    a focusing control unit configured to obtain in-focus states of a plurality of images in the AF area set by the setting unit, the plurality of images being captured by the imaging unit, and based on information about the in-focus states, to perform focusing control of the focusing lens, wherein when the object area is larger than a predetermined size, the setting unit sets an AF area which is smaller than an AF area which corresponds to the object area by decreasing only the size of the object area in the row direction or in the column direction in which a difference occurs in charge readout timing.

2. The imaging apparatus according to claim 1, wherein the detection unit detects the object by extracting face information from the image, and the setting unit sets the AF area according to the face information.

3. The imaging apparatus according to claim 1,
wherein the setting unit switches over depending on whether to set a smaller AF area than an AF area corresponding to the object area according to at least one of a state and a mode of an AF operation.

4. The imaging apparatus according to claim 3, wherein in a mode of placing more priority on tracking of the object than in a case of shooting a still image, the setting unit does not set a smaller AF area than an AF area corresponding to the object area even if the object area is larger than the predetermined size.

5. An imaging apparatus comprising:
an imaging unit having a plurality of pixels arranged two-dimensionally and configured to obtain an image of an object by sequentially scanning a plurality of pixels to read out an image signal while moving the position of a focusing lens;
a detection unit to detect an object area in an image obtained by the imaging unit;
a setting unit to set an AF area corresponding to the object area detected by the detection unit; and
a focusing control unit configured to obtain in-focus states of a plurality of images in the AF area set by the setting unit, the plurality of images being captured by the imaging unit, and based on information about the in-focus states, to perform focusing control of the focusing lens,
wherein when the object area is larger than a predetermined size, the setting unit sets an AF area which is smaller than an AF area which corresponds to the object area, and
wherein when the setting unit sets an AF area smaller than an AF area corresponding to the object area, if the face orientation detected by the detection unit is the same as the direction in which a difference occurs in the charge readout timing, the setting unit sets an AF area so as to include both of eyes detected by the detection unit, and if those two directions differ from each other, the setting unit sets an AF area so as to include one eye detected by the detection unit.

6. The imaging apparatus according to claim 5, wherein the setting unit switches over depending on whether to set a smaller AF area than an AF area corresponding to the object area according to at least one of a state and a mode of an AF operation.

7. The imaging apparatus according to claim 6, wherein in an AF operation, when a still image is captured, the setting unit sets a smaller AF area than an AF area corresponding to an area of the object.

8. The imaging apparatus according to claim 5, further comprising a calculation unit configured to calculate barycentric position of the focusing lens corresponding to the AF area,
wherein the focusing control unit performs focusing control by moving the focusing lens to a barycentric position at which the in-focus state in the AF area is at a maximum.

9. A control method for an imaging apparatus having an imaging unit including a plurality of pixels arranged two-dimensionally and configured to capture an image of an object by sequentially scanning a plurality of pixels to read out an image signal from each pixel while moving the position of a focusing lens, and configured to perform focusing control of the imaging apparatus by taking a plurality of images of an object while moving a position of a focusing lens, and obtaining in-focus states in the AF areas set in the plurality of images, the method comprising:
detecting the object areas in the images; and
setting AF areas associated with the object areas,
wherein when an object area is larger than a predetermined size, a smaller AF area than the AF area corresponding to the object area is set, and
wherein when a set AF area is smaller than the AF area corresponding to the object area, if a face orientation detected is the same as the direction in which a difference occurs in a charge readout timing, an AF area is set so as to include both eyes detected, and if those two directions differ from each other, the an AF area is set so as to include at least one eye detected.

* * * * *